Patented Sept. 12, 1939

2,172,385

UNITED STATES PATENT OFFICE 2,172,385

SYNTHETIC RESINOUS COMPOUND AND
METHOD OF PRODUCING THE SAME

George F. C. Houghton, Teaneck, N. J.

No Drawing. Application August 21, 1936,
Serial No. 97,178

15 Claims. (Cl. 260—3)

The invention relates to compounds of a synthetic resinous nature, and to a novel method of producing the same.

It has for an object a novel method of reacting a synthetic semi-resin with a polymerizable compound; and of incorporating in a synthetic semi-resin matter in a more or less colloidal state, and more especially through the use of a dispersion or plasticizing and flexing agent for such matter and possessing polymerizable properties.

Another object of the invention resides in the provision of a new condensation product possessing a marked resiliency so that when provided in cast or moulded form it is substantially non-fracturable as compared with the usual more or less brittle products heretofore obtained by condensation processes.

Still another object of the invention resides in a novel process which admits of the incorporation with synthetic resins of relatively large proportions of such materials as rubber and cellulosic matter and withal securing clear solutions thereof approaching a water-white color.

A further object of the invention resides in the production of a fully condensed and polymerized resin of marked waterproof quality without loss of flexibility and with enhancement of the usual properties possessed by the moulded or cast synthetic resins.

The invention has for an object, also, a novel product which possesses both thermoplastic and thermosetting qualities, and which is resistant to both alkalis and acids.

In carrying out certain steps of the invention, there is reacted together a suitable phenol and an aldehyde for the production of a phenolic "semi-resin", the condensation being arrested before a solid resin is formed. Phenols, cresols and polyhydric phenols may be utilized in this reaction; and by the terms "phenol" or "phenols", as used throughout the specification and claims, the same are to be understood as including the compound "phenol" as well as its homologues which are all commonly known in the art under the general term "phenol". Similarly, any suitable aldehyde such as formaldehyde, paraldehyde, benzaldehyde, etc., may be caused to react with the phenol; and the term "aldehyde", as used herein, is to be understood as including also the said compounds as well as aldehydic bodies capable of liberating an aldehyde during the progress of the reaction.

The reaction is preferably conducted under conditions of super-atmospheric pressure and at elevated temperatures and in the presence of a suitable catalyst, preferably of an alkaline reaction, although an acid catalyst may be utilized particularly when it is desired to obtain a lighter color of the product. The reaction, as aforesaid, is arrested before the resinous compound formed has advanced too far towards the infusible and insoluble type. There is then to be added to the "semi-resin" a solution of a flexing and/or plasticizing material possessing also waterproofing qualities when assimilated by the resinous mass. For example, rubber, cellulose or cellulosic material is introduced into the resinous compound, as a suitable solution of these materials, and together with a polymerizable compound, such as a polymerizable vinyl compound or products known commercially as "Rezls", "Vinylite", "Gelva", etc., which possess the property of remaining permanently thermoplastic when polymerized.

The particular nature of the solvent for the flexing material or materials is such as to cause the same to blend all the ingredients of the mixture so that a true reaction is effected among all in the subsequent treatment.

This treatment includes further condensation under the application of heat, and pressure if desired, whereby the various compounds are reacted to provide an entirely novel product in the nature of a clear liquid of a light amber to water-white color and possessing the properties of a lacquer with waterproofing qualities. Moreover, this more or less viscid liquid will not advance to the final and complete condensation stage as rapidly as the usual well known synthetic resinous liquids so that it will remain effective for much longer periods, though by the addition of resinate driers such as cobalt resinate, manganese resinate, etc., this period may be shortened as desired. The novel product in its liquid form furnishes an ideal agent for the impregnation of various materials such as paper, leather, textiles, etc., as well as for the treatment of wood, masonry, etc., which may be impregnated therewith or to which it may be applied as a coating. While it cures within a reasonable time after application, this action may be hastened by the application of moderate heat as well as pressure thereto and whereby it becomes further condensed to provide a hard, though more or less flexible, coating and/or filler which is also resistant to both acids and alkalis. By introducing the liquid into suitable moulds, it may be formed into desired shapes either with or without the usual fillers or the use of paper or cloth laminae, the solidification being accomplished by a final condensation thereof through the continued application of a relatively high degree of heat, or by moulding the same in the usual manner after further condensing to the required consistency.

The resulting material is not only thermosetting, as are the usual phenolic and like condensation products, but it is also thermoplastic and in addition possesses a relatively high degree of flexibility not found in the former products, so that the brittleness of these products is obviated and sheets impregnated as set forth may be freely bent without showing cracks. Moreover, when applied as a coating to various materials, and after the solvent has been eliminated by heating, the said coating may be completely cured by passing the coated material through heated calender rolls and without any tendency of the coating to stick to the surface of the rolls. If laminated stock thus coated be passed through the calendering rolls, the heat from these rolls will serve to bond the various laminae through the further condensation of the novel coating material and provide a finished outer surface. Instead of passing coated material through calendering rolls, it may be worked over by the usual ironing methods without the iron sticking to the resinous coating.

The introduction of the polymerizable vinyl compound or compounds to the condensation product not only results in a product having the desirable properties hereinbefore noted, but it assists also in rendering the novel product more fire-resistant upon elimination of any solvent, which property may be enhanced by the addition of such further materials as urea, ethyl cellulose, cellulose acetate, magnesium ammonium phosphate, etc. In the case of the addition of urea, this will provide an additional condensation product with any excess aldehyde present.

Accelerators or "Tuads" such as tetramethylthiurandisulfide for the rubber are also utilized in the preparation of the novel product, while for the solution of the rubber such well known solvents as vinyl chloride, ethylene dichloride, cyclo-hexanols such as "Hexalin" and "Tetralin", "Cymene" (isopropyl toluene) and ketones such as acetone may be utilized singly or, preferably, all together. The more expensive cyclohexanone may be substituted for the said cyclo-hexanols; and in the case of the polymerizable compounds vinyl acetate and vinyl chloride, the prepared products known commercially as "Rezls" (alkyd resins), "Vinylite", "Gelva", etc., which are polymerized vinyl acetate products, may be substituted. The use of these polymerizable compounds with the partial condensation products serves not only to bring about a reaction among the different constituents, but it imparts in the polymerization to the final solidified product the additional property of thermoplasticity which is of great value commercially and not possessed by the condensation products as heretofore prepared.

As a specific mode of procedure, the following treatment has been found to give satisfactory results: A condensation product is prepared by reacting 1600 parts of phenol with 400 parts of paraformaldehyde in the presence of 2 parts of a 28% aqueous solution of ammonia—all parts by weight, the condensation being accomplished in the usual manner. For example, it may be conducted in a closed kettle or autoclave, or in vacuo, for a period of some 12 hours and at a temperature of approximately 90° C. to 100° C., the resulting clear and more or less viscid solution or semi-resin being then permitted to cool to room temperature.

There is prepared, also, a solution of the flexing agent, such as rubber—either natural, treated or synthetic—which may be accomplished with a solvent obtained by mixing together the following:

| | Parts (by volume) |
|---|---|
| Vinyl chloride | 1 |
| Ethylene dichloride | 3 |
| "Tetralin" (cyclo-hexanols) | 2 |
| "Hexalin" | 2 |
| "Cymene" (isopropyl toluene) | 2 |
| Acetone | 3 |

Sufficient of this solvent is utilized to completely dissolve 160 parts by weight of the rubber, the acetone acting as a clearing agent to provide an almost water-white viscous solution. Well-known rubber accelerators, known commercially as "Tuads", may be introduced in small amounts into the solution at this stage, or subsequently, for the purpose of accelerating vulcanization of the rubber to match the condensation of the semi-resin and the polymerization of the vinyl compound to be added.

To the semi-resin still in the kettle or container, the aforesaid solution of rubber is added and together with 800 parts by weight of vinyl acetate and 200 parts by weight of urea, the latter condensing with the excess aldehyde to impart additional fire-retarding properties to the final product. Heat is then again applied to further condense the semi-resin, condense the urea and polymerize the vinyl compound, the dissolved rubber being dispersed by its solvent, with agitation, throughout the entire resinous mass as a flexing agent.

The run is to be continued for some 12 hours at approximately 90° C. to 100° C. The temperature may then be lowered, say to from 50° C. to 60° C.; and there is added cellulosic material such as 400 parts by weight of ethyl cellulose and/or 200 parts by weight of cellulose acetate dissolved in the hereinbefore noted rubber solvent as a 25-50% solution thereof. The mixture is agitated some 2 to 3 hours until the resultant product is a homogeneous mass of a consistency of drawn honey.

If the "Tuads" have not been previously added, they may now be introduced to the extent of 8 parts by weight; and at this stage it is preferred to introduce a further fire-retarding agent, preferably magnesium ammonium phosphate, in the amount of 200 parts by weight thereof. This compound is also soluble in the aforementioned rubber solvent with the addition of a slight amount of phosphoric acid, say 3 parts by weight, which may, moreover, assist in the condensation. If necessary, the entire solution may be bleached with sodium perborate in the amount of 100 parts thereof and which is merely beaten into the viscid mass. The latter is then allowed to cool for further and complete condensation thereafter, or it may be maintained in lacquer condition by thinning through the addition of the aforesaid rubber solvent thereto to secure the desired consistency.

If a product of lesser flexibility and/or plasticity be desired, the proportions of the flexing agent may be accordingly varied. Thus, the amount of the rubber may be increased to 200 parts and the ethyl cellulose to 600 parts and the cellulose acetate to 300 parts, the mode of procedure being otherwise the same.

Similarly, should it be desired to provide a less flexible product, the content of the condensation products is increased, together with a reduction in the flexing agent, if necessary. For example, while the phenolic content remains the same, the amount of the urea may be increased to 300 parts necessitating also an increase in the aldehyde to 530 parts and the catalyst to 3 parts. The ethyl cellulose content is reduced to 200 parts. In the resulting product, the thermosetting elements predominate with elevation also of the point at which the completed resin will soften; whereas in the case of the former product, the flexing agent is more prominent and the heat softening point is somewhat depressed.

I claim:

1. A resinous compound comprising in chemical combination a condensation product of a phenol and an aldehyde and having incorporated therein from 20% to 30% by weight of rubber, together with a polymerized vinyl compound of the group consisting of vinyl chloride and vinyl acetate and capable of being cast or moulded under applied heat to a solid characterized by both thermosetting and thermoplastic properties.

2. A resinous compound comprising in chemical combination a condensation product of a phenol and an aldehyde and having incorporated therein from 20% to 30% by weight of rubber and from 20% to 30% of a cellulose compound of the group consisting of ethyl cellulose and cellulose acetate, together with a polymerized vinyl compound of the group consisting of vinyl chloride and vinyl acetate and capable of being cast or moulded under applied heat to a solid characterized by both thermosetting and thermoplastic properties.

3. A synthetic resinous compound, being a condensation product obtained by reacting 1600 parts of phenol with 400 parts of paraformaldehyde in the presence of 2 parts of a 25% aqueous solution of ammonia; together with 200 parts of urea, 800 parts of vinyl acetate, 400 parts of ethyl cellulose, 200 parts cellulose acetate and 200 parts of magnesium ammonium phosphate; and a solution of 160 parts of rubber—all parts by weight.

4. A synthetic resinous compound, being a condensation product obtained by reacting 1600 parts of phenol with 400 parts of paraformaldehyde in the presence of 2 parts of a 25% aqueous solution of ammonia; together with 200 parts of urea, 800 parts of vinyl acetate, 600 parts of ethyl cellulose, 300 parts cellulose acetate and 200 parts of magnesium ammonium phosphate; and a solution of 200 parts of rubber—all parts by weight.

5. A synthetic resinous compound, being a condensation product obtained by reacting 1600 parts of phenol with 530 parts of paraformaldehyde in the presence of 3 parts of a 25% aqueous solution of ammonia; together with 300 parts of urea, 800 parts of vinyl acetate, 200 parts of ethyl cellulose, 200 parts cellulose acetate and 200 parts of magnesium ammonium phosphate; and a solution of 160 parts of rubber—all parts by weight.

6. A clear, waterproofing resinous liquid, comprising the partially condensed reaction product of a phenol and an aldehyde, an admixture of rubber in solution and a vinyl compound of the group consisting of vinyl chloride and vinyl acetate, the liquid being characterized by its ability to further condense, upon application of heat, to a water-resistant solid.

7. A clear, waterproofing resinous liquid, comprising the partially condensed reaction product of a phenol and an aldehyde, and an admixture of rubber and a cellulose compound of the group consisting of ethyl cellulose and cellulose acetate in solution and a vinyl compound of the group consisting of vinyl chloride and vinyl acetate, the liquid being characterized by its ability to further condense, upon application of heat, to a water-resistant solid.

8. The process which comprises reacting together a phenol and an aldehyde in the presence of a catalyst and in such proportions and at such temperatures and pressures and for a time sufficient to secure a partially condensed resinous product thereof; adding to said product, together with a polymerizable vinyl compound of the group consisting of vinyl chloride and vinyl acetate, a flexing and solvent agent; and then further reacting the whole.

9. The process for the production of resinous compounds, which comprises causing a reaction to occur between a phenol and an aldehyde to the extent of securing a partial condensation product thereof, adding thereto a solution of rubber and a cellulose compound of the group consisting of ethyl cellulose and cellulose acetate, together with a vinyl compound of the group consisting of vinyl chloride and vinyl acetate, and completing the condensation.

10. The process for the production of resinous compounds, which comprises causing a reaction to occur between a phenol and an aldehyde to the extent of securing a partial condensation product thereof, adding thereto a solution of rubber, together with a polymerizable vinyl compound of the group consisting of vinyl chloride and vinyl acetate, and completing the condensation.

11. A resinous compound, comprising in chemical combination a phenolic, aldehyde-reacting condensation product, rubber, and a polymerized vinyl compound of the group consisting of vinyl chloride and vinyl acetate.

12. A resinous compound, comprising in chemical combination a phenolic, aldehyde-reacting condensation product, rubber, a cellulose compound of the group consisting of ethyl cellulose and cellulose acetate, and a polymerized vinyl compound of the group consisting of vinyl chloride and vinyl acetate.

13. A clear, resinous compound, comprising in chemical combination a phenolic, aldehyde-reacting condensation product, rubber, and a polymerized vinyl compound of the group consisting of vinyl chloride and vinyl acetate.

14. A resinous compound, comprising in chemical combination a phenolic condensation product, a urea condensation product, rubber, a cellulose compound of the group consisting of ethyl cellulose and cellulose acetate, and a polymerized vinyl compound of the group consisting of vinyl chloride and vinyl acetate, and characterized by thermo-setting and thermo-plastic properties.

15. A synthetic resinous compound, being a condensation product obtained by reacting phenol with paraformaldehyde in the presence of an aqueous solution of ammonia; together with urea, vinyl acetate, ethyl cellulose, cellulose acetate, and magnesium ammonium phosphate; and a solution of rubber.

GEORGE F. C. HOUGHTON.